2,214,340
STABILIZED VIABLE ATTENUATED MEASLES VIRUS VACCINES AND THEIR PRODUCTION
Gwenneth Doreen Laurence, London, England, assignor to Burroughs Wellcome & Co. (U.S.A.) Inc., Tuckahoe, N.Y., a corporation of New York
No Drawing. Filed Sept. 5, 1962, Ser. No. 221,455
Claims priority, application Great Britain, Sept. 8, 1961, 32,421/61
1 Claim. (Cl. 167—78)

This invention relates to vaccines conferring immunity against viral diseases and to their production.

It is well known that a non-immune individual can be protected from a subsequent attack of a vital disease by immunisation with a vaccine containing living virus immunologically related to the virulent virus but not itself pathogenic. Such a vaccine may contain an attenuated strain derived from the virulent virus. The efficacy of the vaccine depends on the virability of the virus it contains. (The virability is the proportion of the birus that can resume growth and reproduction when a suitable environment is provided.)

Measles is a viral disease, and a person can be protected against measles by vaccination with an attenuated measles virus. The production of an attenuated measles virus vaccine with an adequate shelf life has hitherto been hindered by the instability of the virus. It is unstable in aqueous media containing no protein, and loses viability on storage not only $+4°$ C. but even at $-70°$ C.

It has been found that a satisfactory stable attenuated measles virus vaccine can be obtained by freeze-drying from an aqueous medium in the presence of sorbitol as a stabilizer. On freeze-drying, there may be some loss of viability, but this is much less in the presence of sorbitol than in its absence. The beneficial effect seems to be quite specific to sorbitol, for other carbohydrates are much less effective as stabilisers; this is true of reducing sugars such as glucose or lactose, non-reducing sugars such as sucrose, polysaccharides such as dextran and even other sugar alcohols such as mannitol.

The concentration of sorbitol in the wet vaccine before freeze-drying is preferably at least 1%, and 4–6% is convenient although higher concentrations such as 10% may be used. The wet vaccine may contain other additives besides sorbitol; the use of sorbitol and dextran, for example, gives a less hygroscopic freeze-dried vaccine of more satisfactory appearance than that obtained by use of a sorbitol alone.

The following example illustrates the invention.

*Measles vaccine*

Attenuated measles virus (Enders strain) was grown in chick embryo tissue culture. The cell obtained by treatment with trypsin of decapitated 7–11 day-old chick embryos were suspended in a nutrient medium containing serum and explanted into Roux culture flasks. The cultures were incubated at 37° C. until a confluent cell sheet was formed and were then infected with the measles virus. Each culture was washed with balanced salt solution twice before inoculation with virus and twice after the virus had been in contact with the cells for one hour. The cultures were fed with medium SM 199 and incubated at 32° C. for 7–14 days. All the liquid from one batch of cultures was pooled, and gross cell debris was removed by centifugation. The wet vaccine thus harvested, containing the measles virus in medium SM 199, was stored at $+4°$ C. until freeze-dried.

To 700 ml. of the wet vaccine was added 100 ml. of 40% sorbitol solution in medium SM 199. This mixture containing 5% sorbitol was dispensed into ampoules, 0.5 ml. per ampoule, and freeze-dried to give stable measles vaccine. The drying was carried out in two stages, first using a solid carbon dioxide alcohol condenser, and second using phosphorus pentoxide as desiccant.

Similar stable freeze-dried measles vaccines were prepared from wet vaccines containing (a) 5% sorbitol plus 6% dextran, (b) 1% sorbitol, and (C) 1% sorbitol plus 6% dextran.

I claim:

A viable storage-stable measles vaccine containing an attenuated strain of measles virus (Enders strain), medium SM 199, and sorbitol as the essential ingredients, obtained by incubating at 37° C., decapiitated trypsinized 7–11 day old chick embryos suspended in serum-containing nutrient medium, which have been washed with balanced salt solution twice before inoculation with attenuated measles virus (Enders strain) and twice after the virus had been in contact with the said cells for about one hour, feeding the inoculated cultures with medium SM 199, incubating at 32° C. for 7–14 days, harvesting all the wet liquid vaccine containing the treated attenuated (Enders strain) measles virus, maintaining the attenuated and so treated measles virus at 4° C. until freeze-dried, adding a stabilizing mixture of sorbitol solution in medium SM 199 until there is present at least a 1% concentration of sorbitol before freeze-drying, dispensing the wet vaccine containing the mixture of sorbitol and medium SM 199 into ampoules, and freeze-drying the product.

References Cited by the Examiner

UNITED STATES PATENTS

| | | | |
|---|---|---|---|
| 2,879,202 | 3/59 | Aiston et al. | 167—78 |
| 3,133,861 | 5/64 | Schwarz | 167—78 |

OTHER REFERENCES

Dubes et al.: "Cold-adapted Genetic Variants of Polioviruses" Science 124 (3222), pages 586–588 (1956).

Dubes et al.: "Vibrulence of Polioviruses in Relation to Variant Characteristics Distinguishable on Cells in Vitro," Virology 4, pages 275-296, October 1957.

Enders et al.: "Studies on an Attenuated Measles-Virus Vaccine," New Eng. J. Med., 263 (4), pages 153–184, July 28, 1960.

Goffee et al.: "Vaccination Against Measles," British Medical Journal, pages 1244–1253, November 11, 1961.

Gorman et al.: "Research on a So-called Cold Variant of Poliomyelitis Virus," Ann. Inst. Pasteur (Paris), 98, pages 351–9, March 1960.

Musser et al.: "Studies on Measles Virus," J. Immun. 85, pages 292–297, September 1960.

Schwartz et al.: "Experimental Vaccination Against Measles," J. Amer. Med. Assoc. 173 (8), pages 861–872, June 25, 1960.

Stokes et al.: "Use of Living Attenuated Measles Virus Vaccine in Early Infancy," New England J. Med. 263 (5), pages 230–233, August 4, 1960.

LEWIS GOTTS, *Primary Examiner.*